United States Patent
Imi et al.

(10) Patent No.: US 11,615,226 B2
(45) Date of Patent: Mar. 28, 2023

(54) RECORDING MEDIUM, COMPUTING METHOD, AND COMPUTING DEVICE

(71) Applicants: Kabushiki Kaisha Toshiba, Tokyo (JP); Toshiba Electronic Devices & Storage Corporation, Tokyo (JP)

(72) Inventors: Hitoshi Imi, Yokohama Kanagawa (JP); Motochika Okano, Chuo Tokyo (JP); Yoshinori Fukuba, Yokohama Kanagawa (JP)

(73) Assignees: KABUSHIKI KAISHA TOSHIBA, Tokyo (JP); TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 191 days.

(21) Appl. No.: 17/017,814

(22) Filed: Sep. 11, 2020

(65) Prior Publication Data

US 2021/0294956 A1    Sep. 23, 2021

(30) Foreign Application Priority Data

Mar. 23, 2020    (JP) .............................. JP2020-051733

(51) Int. Cl.
*G06F 30/30*    (2020.01)
*G06F 30/392*    (2020.01)
(Continued)

(52) U.S. Cl.
CPC .......... *G06F 30/392* (2020.01); *G06F 30/367* (2020.01); *G06F 30/30* (2020.01);
(Continued)

(58) Field of Classification Search
None
See application file for complete search history.

(56) References Cited

U.S. PATENT DOCUMENTS 5,592,392 A * 1/1997 Matheson ............... G06F 30/39
716/139
5,745,371 A * 4/1998 Shouen ................... G06F 30/39
716/137
(Continued)

FOREIGN PATENT DOCUMENTS

JP    H10-326300 A    12/1998
JP    H11-353339 A    12/1999
(Continued)

OTHER PUBLICATIONS

P. Xie et al., "Product Information Model and System Integration based on Generalized CAD," Proc. of the 2010 IEEE Int'l Conference on Information and Automation, Jun. 20-23, Harbin, China, pp. 255-259. (Year: 2010).*

*Primary Examiner* — Leigh M Garbowski
(74) *Attorney, Agent, or Firm* — Allen & Overy LLP

(57) ABSTRACT

A recording medium includes simulation data input into a computing device executing a simulation of a semiconductor device, wherein the simulation data includes part shape information describing a shape of a part included in a simulation target circuit, model information describing operation and connection information of the simulation target circuit, and symbol information of the part included in the simulation target circuit, and the computing device causes the part shape information, the model information, and the symbol information to correspond to each other to execute the simulation of the semiconductor device.

21 Claims, 8 Drawing Sheets

```
I1: PART SHAPE     Ln1 { <shape>
    INFORMATION            <polygon points = 100,100,400,100,400,400 100,400>
                           <polygon points = 100,450,200,450,200,500 100,500>
                           <polygon points = 250,450,350,450,350,500 250,500>
                           <polygon points = 350,450,450,450,450,500 350,500>
                           </shape>
                   Ln2 { <socket name = NMOS>
                           <port id="1" x="250" y="250" name="1" >
                           <port id="2" x="350" y="450" name="2" >
                           <port id="3" x="150" y="450" name="3" >
                           </socket >

I2: MODEL          Ln3 { <reference format="SPICE" refile="NMOS.lib">
    INFORMATION            <connection port_id="1" socket_name="NMOS">
                             <spice:ref_port portid="A" subckt="FET">
                           <connection port_id="2" socket_name="NMOS">
                             <spice:ref_port portid="B" subckt="FET">
                           <connection port_id="3" socket_name="NMOS">
                             <spice:ref_port portid="C" subckt="FET">
                           </ reference >

I3: SYMBOL         Ln4 { <symbol>
    INFORMATION            <polygon points = 100,100,400,100,400,400 100,400>
                           <circle points = 100,450,30 >
                           <circle points = 50,300,30 >
                           <circle points = 100,150,30 >
                           </ symbol >
                   Ln5 { <socket name = NMOS>
                           <port id="1" x="250" y="250" name="1" >
                           <port id="2" x="350" y="450" name="2" >
                           <port id="3" x="150" y="450" name="3" >
                           </socket>
```

(51) Int. Cl.
  *G06F 30/367* (2020.01)
  *G06F 119/08* (2020.01)
  *G06F 119/12* (2020.01)
  *G06F 119/10* (2020.01)

(52) U.S. Cl.
  CPC ...... *G06F 2119/08* (2020.01); *G06F 2119/10* (2020.01); *G06F 2119/12* (2020.01)

(56) References Cited

U.S. PATENT DOCUMENTS

| | | | | |
|---|---|---|---|---|
| 6,789,243 | B2 * | 9/2004 | Nakagawa | G06F 30/392 716/124 |
| 7,398,497 | B2 * | 7/2008 | Sato | G06F 30/367 716/112 |
| 7,810,051 | B2 * | 10/2010 | Ohashi | G06F 30/39 716/118 |
| 8,504,977 | B1 * | 8/2013 | Yen | G06F 30/394 716/110 |
| 8,745,571 | B2 * | 6/2014 | Li | G06F 30/39 716/132 |
| 2007/0245274 | A1 * | 10/2007 | Kimura | G06F 30/39 716/139 |
| 2017/0161425 | A1 * | 6/2017 | DeHond | G06F 30/367 |

FOREIGN PATENT DOCUMENTS

| | | | |
|---|---|---|---|
| JP | 3178458 | B2 | 6/2001 |
| JP | 4862899 | B2 | 1/2012 |
| JP | 2017-10248 | A | 1/2017 |

* cited by examiner

I1: PART SHAPE INFORMATION
- Ln1:
```
<shape>
  <polygon points = 100,100,400,100,400,400 100,400>
  <polygon points = 100,450,200,450,200,500 100,500>
  <polygon points = 250,450,350,450,350,500 250,500>
  <polygon points = 350,450,450,450,450,500 350,500>
</shape>
```
- Ln2:
```
<socket name = NMOS>
<port id="1" x="250" y="250" name="1" >
<port id="2" x="350" y="450" name="2" >
<port id="3" x="150" y="450" name="3" >
</socket >
```

I2: MODEL INFORMATION
- Ln3:
```
<reference format="SPICE" refile="NMOS.lib">
  <connection port_id="1" socket_name="NMOS">
    <spice:ref_port portid="A" subckt="FET">
  <connection port_id="2" socket_name="NMOS">
    <spice:ref_port portid="B" subckt="FET">
  <connection port_id="3" socket_name="NMOS">
    <spice:ref_port portid="C" subckt="FET">
</ reference >
```

I3: SYMBOL INFORMATION
- Ln4:
```
<symbol>
  <polygon points = 100,100,400,100,400,400 100,400>
  <circle points = 100,450,30 >
  <circle points = 50,300,30 >
  <circle points = 100,150,30 >
</ symbol >
```
- Ln5:
```
<socket name = NMOS>
<port id="1" x="250" y="250" name="1" >
<port id="2" x="350" y="450" name="2" >
<port id="3" x="150" y="450" name="3" >
</socket >
```

FIG. 3

FILE NAME: NMOS.lib

```
M1 1 2 3 NMOS L=0.3u W=0.1u
.MODEL NMOS
+ LEVEL = 1
+ KP = 2.3E-05
+ LAMBDA = 2
+ TOX = 3.5E-08
+ UO = 600
...
```

US 11,615,226 B2

RECORDING MEDIUM, COMPUTING METHOD, AND COMPUTING DEVICE

CROSS REFERENCE TO RELATED APPLICATIONS

This application is based upon and claims the benefit of priority from the prior Japanese Patent Application No. 2020-51733, filed on Mar. 23, 2020, the entire contents of which are incorporated herein by reference.

FIELD

One embodiment of the present invention relates to a recording medium, a computing method, and a computing device.

BACKGROUND

In designing a system including an electric part such as a motor, a simulation based on a circuit diagram or a block diagram cannot be a simulation that takes into consideration part arrangement and part size in the system. Currently, in many cases, an operator manually examines part arrangement and part size in the system on computer aided design (CAD) software, and it takes time to determine the part arrangement and the part size.

BRIEF DESCRIPTION OF THE DRAWINGS

FIG. 3 illustrates a specific example of the simulation data in FIG. 1.

DETAILED DESCRIPTION

According to one embodiment, a recording medium includes simulation data input into a computing device executing a simulation of a semiconductor device, wherein the simulation data includes part shape information describing a shape of a part included in a simulation target circuit, model information describing operation and connection information of the simulation target circuit, and symbol information of the part included in the simulation target circuit, and the computing device causes the part shape information, the model information, and the symbol information to correspond to each other to execute the simulation of the semiconductor device.

An embodiment of a recording medium, a computing method, and a computing device will be described below with reference to the drawings. Hereinbelow, main components of simulation data, a computing method, and a computing device will mainly be described, and the simulation data, the computing method, and the computing device may have components and functions that are not illustrated or described. The following description does not exclude the components and the functions that are not illustrated or described.

Figure 1:
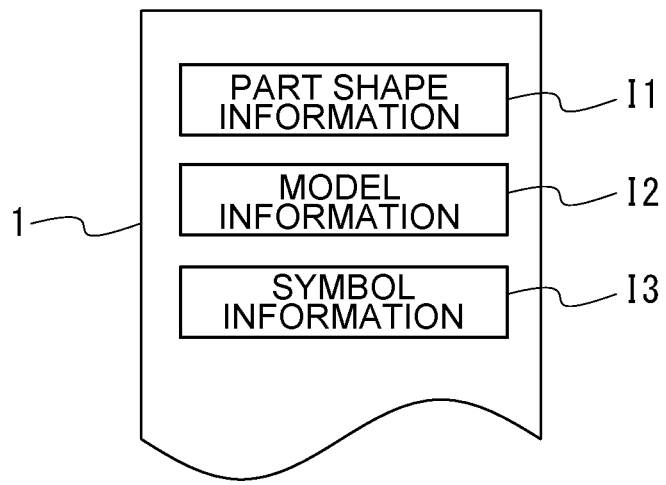
FIG. 1 illustrates simulation data according to an embodiment.

FIG. 1 illustrates simulation data 1 according to an embodiment. The simulation data 1 in FIG. 1 includes part shape information I1, model information I2, and symbol information I3. The simulation data 1 in FIG. 1 can be recorded on a recording medium. The type of the recording medium is not particularly limited. For example, the recording medium may be a semiconductor memory, a magnetic recording device, an optical disk, or a magneto-optical disk.

The part shape information I1 is information describing a shape of a part included in a simulation target circuit. Here, the information describing the shape is information indicating an outer shape of a semiconductor device, such as a size of the semiconductor device and positional information of the corners. The simulation target circuit is not limited and may be an analog circuit, a digital circuit, or a mixture of the analog circuit and the digital circuit. The type of the part is not particularly limited. The part may be an integrated circuit (IC) or a discrete part.

Figure 2A:
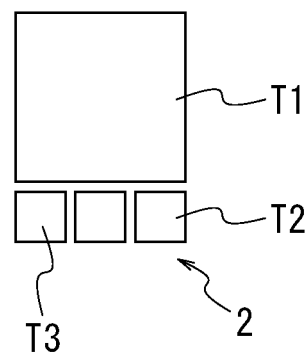
FIG. 2A is a plan view illustrating an example of a part.

FIG. 2A is a plan view illustrating an example of a part 2. The part 2 in FIG. 2A is an NMOS transistor, for example, and includes three terminals T1 to T3. The part shape information I1 includes information defining an outer shape of the part 2. In the example in FIG. 2A, coordinate information of corners (black circle positions in FIG. 2B) of the part 2 is included in the part shape information I1. The part shape information I1 may also include positional information of the terminals of the part 2. As illustrated in FIG. 2A, coordinate information of the three terminals may be included in the part shape information I1.

The model information I2 in FIG. 1 is information describing operation and connection information of the simulation target circuit. Here, the operation information is information describing what kind of operation the simulation target circuit performs. The connection information is information indicating a connection relationship between a certain element and another element. In a more specific example, the connection information is information indicating to which terminal of another element each terminal of a certain element is connected and to which input terminal or output terminal in the semiconductor device each terminal of a certain element is connected. Based on the description of the model information I2, a circuit can automatically be generated with use of a simulator or the like. The model information I2 includes connection information of the part 2 included in the simulation target circuit and operation information of the part 2. The model information I2 includes information about the terminals of the part 2. The information about the terminals of the part 2 includes information indicating correspondence to the terminals of the part 2 included in the part shape information I1. More specifically, the information about the terminals of the part 2 includes connection information of the terminals of the part 2. The model information I2 may include a file name of a file describing the operation of the simulation target circuit and information for reference to the file.

Figure 2B:
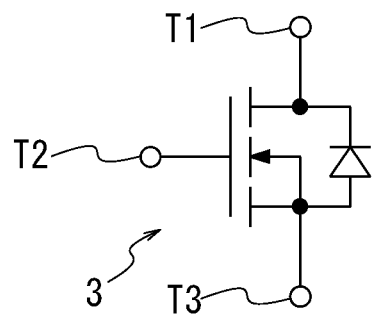
FIG. 2B illustrates an example of a symbol representing an NMOS transistor in FIG. 2A.

The symbol information I3 in FIG. 1 is a symbol representing the part 2 included in the simulation target circuit. The symbol information I3 has only to be a symbol which can easily be identified as the part 2 and does not necessarily have to be a symbol in a unified form. FIG. 2B illustrates an example of a symbol 3 representing the NMOS transistor in FIG. 2A. The symbol 3 in FIG. 2B is provided with three terminals T1 to T3 to correspond to the terminals T1 to T3 in FIG. 2A. Meanwhile, since, in the symbol information I3, a terminal name in the symbol 3 is described to correspond to a terminal name in the part shape information I1, the terminal name in the part shape information I1 and the terminal name in the symbol 3 do not necessarily have to be the same. The symbol information I3 differs per type of the part 2 and includes positional information of the terminals of the part 2. The symbol information I3 is described to correspond to the positional information of the terminals of the part 2 included in the part shape information I1.

The simulation data 1 in FIG. 1 can be stored in one file (hereinbelow referred to as an integrated file in some cases). This file is generated in a format that can be interpreted and executed by a computer. The file may also be made downloadable from a particular website, for example. The downloaded file can be interpreted and executed by a downloading computer. The computer executes the simulation data in the integrated file to enable a circuit to be generated and enable an operation examination (simulation) of the generated circuit to be performed. The simulation may be performed by inputting the integrated file into a dedicated simulator instead of the computer. In the present specification, a computer or the like that interprets and executes the integrated file is collectively referred to as a computing device.

FIG. 3 illustrates a specific example of the simulation data 1 in FIG. 1, which is the content of the aforementioned integrated file. The simulation data 1 in FIG. 3 illustrates a description example regarding the NMOS transistor, which is the part 2 in FIGS. 2A and 2B. The simulation data 1 in FIG. 3 is text information composed of ASCII code and includes the part shape information I1, the model information I2, and the symbol information I3. In the example in FIG. 3, although the part shape information I1, the model information I2, and the symbol information I3 are described in this order, the order in which the respective pieces of information are described is arbitrary.

The part shape information I1 in FIG. 3 includes a line group Ln1 describing the coordinates of the outer shape of the part 2 and a line group Ln2 describing the identification information and the coordinates of the terminals T1 to T3 of the part 2. As illustrated in FIG. 2A, each of the terminals T1 to T3 of the part 2 has a predetermined length and width, and the line group Ln2 describes the center coordinates of the region of each of the terminals T1 to T3.

Figures 4, 5:
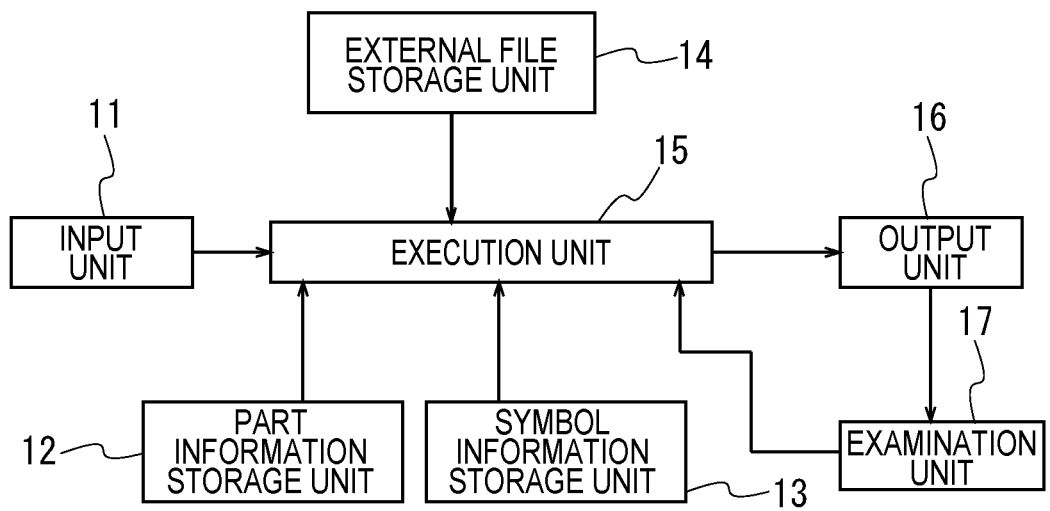
FIG. 4 illustrates an example of an external file.
FIG. 5 is a block diagram illustrating an example of an internal configuration of a computing device.

A first line in a line group Ln3 describing the model information I2 in FIG. 3 refers to an external file "NMOS.Lib". This external file is a file describing the operation and connection information of the simulation target circuit. FIG. 4 illustrates an example of the external file. In the external file in FIG. 4, terminal information, characteristics, operation and connection information, and the like of the NMOS transistor, which is the part 2 in FIGS. 2A and 2B, are described. The characteristics include a gate width, a gate length, a film thickness of a gate insulating film, and a voltage range supplied to a gate, of the NMOS transistor, for example.

In second and subsequent lines in the line group Ln3 describing the model information I2 in FIG. 3, the correspondence relationship between each terminal of the NMOS transistor in the part shape information I1 and each terminal of the NMOS transistor in the model information I2 is described. For example, while the NMOS transistor in the part shape information I1 sets identification IDs corresponding to the terminals T1 to T3 to "1" to "3", the NMOS transistor in the model information I2 sets identification IDs corresponding to the terminals T1 to T3 to "A", "B" and "C". Hence, the second and subsequent lines describe that "1" corresponds to "A", that "2" corresponds to "B", and that "3" corresponds to "C".

The symbol information I3 in FIG. 3 includes a line group Ln4 describing the outer shape of the symbol and a line group Ln5 describing the correspondence relationship between the terminals A, B, and C of the symbol and the terminals T1 to T3 of the NMOS transistor in the part shape information I1. FIG. 3 is an example of the model information I2, and the format of the model information I2 is arbitrary.

The integrated file containing the simulation data 1 illustrated in FIG. 3 may be stored in a not-illustrated storage unit as necessary. The simulation data 1 illustrated in FIG. 3 is read by a computing device such as a simulator, the content of the integrated file is interpreted, and a simulation is executed.

FIG. 5 is a block diagram illustrating an example of an internal configuration of a computing device 10. The computing device 10 in FIG. 5 includes an input unit 11, a part information storage unit 12, a symbol information storage unit 13, an external file storage unit 14, an execution unit 15, an output unit 16, and an examination unit 17, The computing device 10 in FIG. 5 executes a simulation of the semiconductor device. The computing device 10 uses the simulation data 1 to cause the part shape information I1, the model information I2, and the symbol information I3 to correspond to each other to execute the simulation of the semiconductor device.

The input unit 11 inputs the integrated file illustrated in FIG. 3. An operator may input the integrated file illustrated in FIG. 3 with use of a keyboard or the like. Alternatively, the operator may electronically retrieve the integrated file from an electric device having a communication function via the input unit 11.

The part information storage unit 12 stores various kinds of part information. The part information is information about the outer shape, size, number of terminals, terminal position, and the like of the part 2, as illustrated in FIG. 2A.

The symbol information storage unit 13 stores the symbol information I3 of various parts 2, The symbol information I3 is a symbol of each part 2, information of terminals included in the symbol, and the like, as illustrated in FIG. 2B.

The external file storage unit 14 stores the external file described in the model information I2. Meanwhile, in a case in which the operation and connection information of the simulation target circuit is directly described in the model information I2 without reference to the external file, the external file storage unit 14 may not be provided.

The execution unit 15 reads and interprets the part shape information I1, the model information I2, and the symbol information I3 described in the input integrated file, generates the simulation target circuit based on the part shape information I1, the model information I2, and the symbol information I3, and executes a simulation based on the generated circuit.

As will be described below, there are a plurality of simulations that the execution unit 15 is to execute such as a circuit simulation, an electromagnetic field simulation, and a temperature simulation. Although the present specification illustrates an example in which the single execution unit 15 performs a plurality of simulations, a plurality of computing devices 10 (simulators) may perform different simulations, respectively.

The output unit 16 outputs a simulation result executed by the execution unit 15. The output format of the simulation result is arbitrary.

The examination unit 17 examines whether or not the circuit generated based on the integrated file or the layout is valid based on the simulation result output from the output unit 16, and if not, changes the circuit or the layout.

Figure 6:
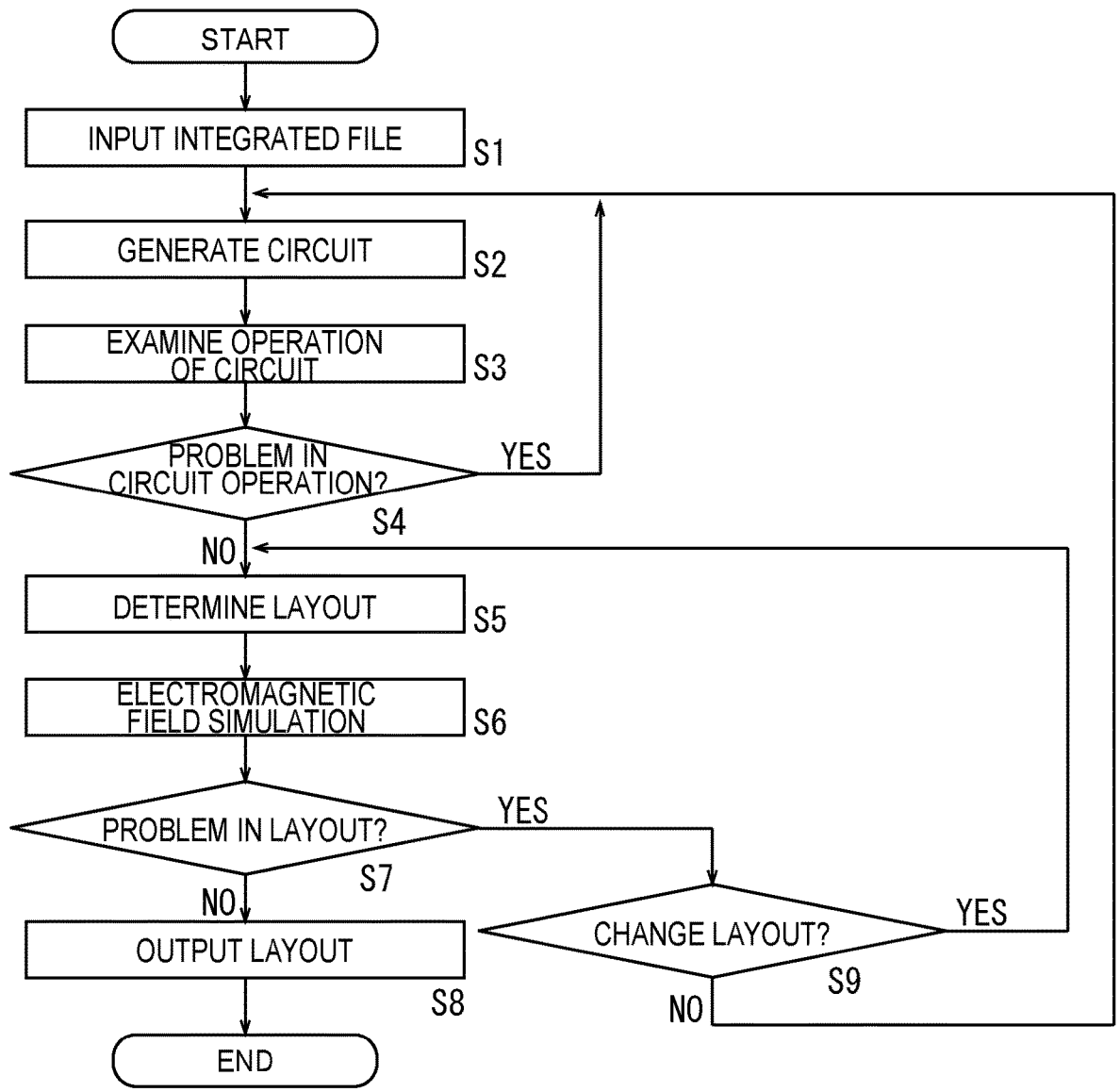
FIG. 6 is a flowchart illustrating an example of a processing operation of the computing device.

FIG. 6 is a flowchart illustrating an example of a processing operation of the computing device 10. First, the integrated file is input via the input unit 11 (step S1). Subsequently, the execution unit 15 reads and interprets the integrated file and generates the simulation target circuit based on the part shape information I1, the model information I2, and the symbol information I3 (step S2). The generated simulation target circuit is output from the output unit 16.

Figure 7:
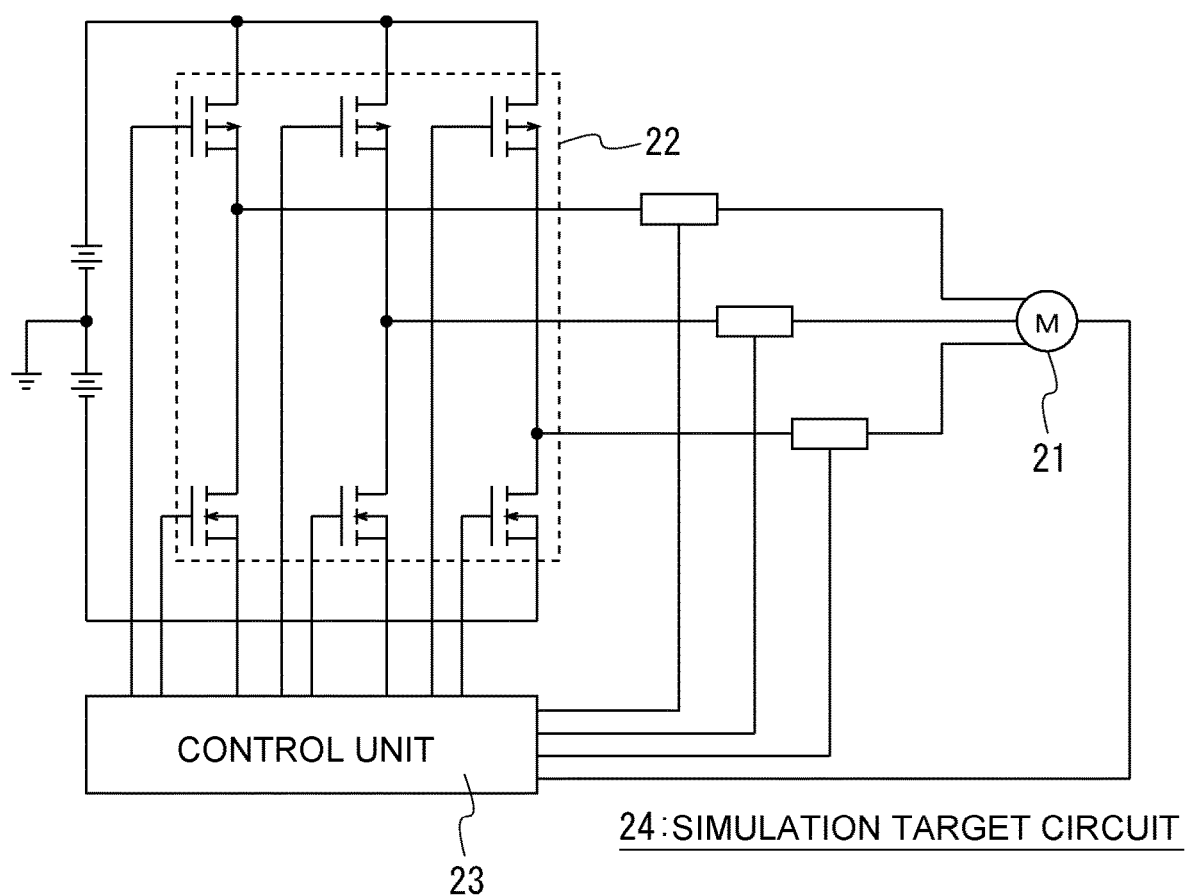
FIG. 7 is a circuit diagram illustrating an example of a simulation target circuit generated in step S2 in FIG. 6.

FIG. 7 is a circuit diagram illustrating an example of the simulation target circuit generated in step S2 in FIG. 6. The simulation target circuit in FIG. 7 includes, as main parts 2, a motor 21, a plurality of transistors 22 controlling driving of the motor 21, and a control unit 23 controlling the gate voltage of these transistors 22. The symbol of each part 2 included in the simulation target circuit in FIG. 7 is included in the symbol information I3.

Subsequently, the execution unit 15 and the examination unit 17 use the circuit simulator to examine the operation of the simulation target circuit (step S3). Subsequently, it is determined whether or not there is a problem in the operation of the simulation target circuit based on a simulation result of the circuit simulator (step S4). In a case in which there is a problem in the operation, the processing in step S2 and subsequent steps is repeated. Meanwhile, depending on the case, a new integrated file may be input again when it is determined in step S4 that there is a problem. In this case, the processing in step S1 and subsequent steps is repeated.

In a case in which it is determined in step S4 that there is no problem in the operation, the layout is determined based on the simulation target circuit whose operation has been examined (step S5). Although the computing device 10 according to the present embodiment can determine the layout, the processing in step S5 and subsequent steps may be performed by another computing device 10 or the like. Alternatively, the computing device 10 according to the present embodiment may request another device that performs the layout determination to perform the layout determination processing, receive the layout determination result, and perform the processing in step S5 and subsequent steps.

Figure 8:
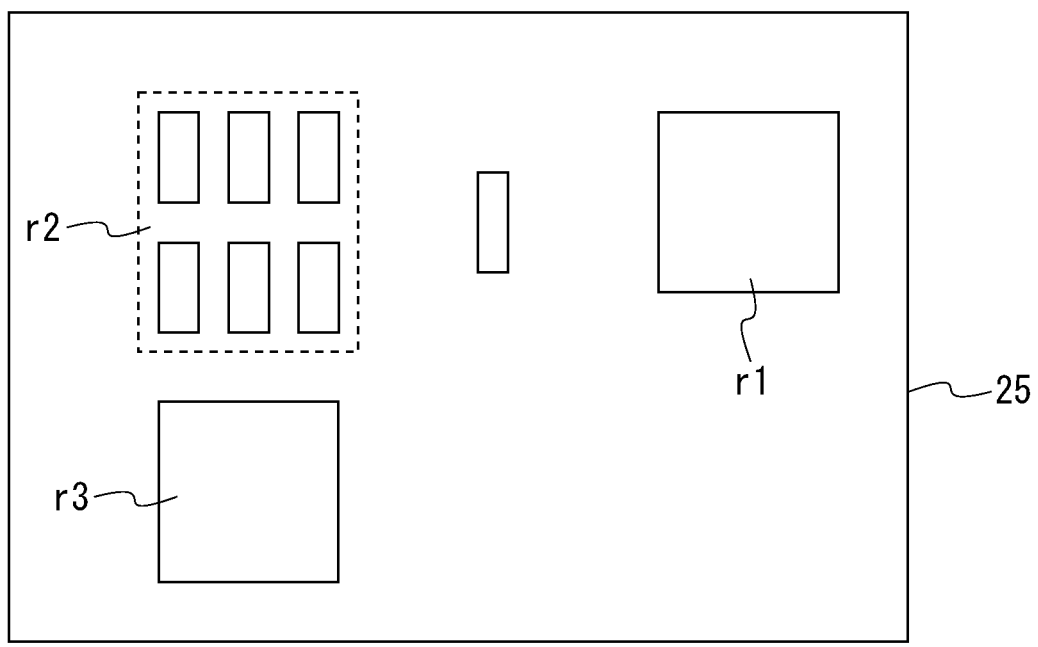
FIG. 8 schematically illustrates an example of a layout determination result.

FIG. 8 schematically illustrates an example of the layout determination result. In the example in FIG. 8, the motor 21 in FIG. 7 is arranged in an arrangement region r1, the plurality of transistors 22 are arranged in an arrangement region r2, and the control unit 23 is arranged in an arrangement region r3.

After performing the layout determination in step S5 in FIG. 6, the computing device 10 performs an electromagnetic field simulation based on the layout determination result (step S6). Subsequently, it is determined whether or not a result of the electromagnetic field simulation has a problem (step S7). For example, in a case in which it is determined in the electromagnetic field simulation that an electro magnetic interference (EMI) noise generated from a part of the layout region of the semiconductor device exceeds a predetermined threshold value, it is determined that there is a problem.

In a case in which it is determined in step S7 that there is a problem, it is determined whether or not to change the layout (step S9). In a case in which it is determined that the layout is to be changed, the processing in step S5 and subsequent steps is repeated. On the other hand, in a case in which it is determined that the problem in step S7 cannot be solved by, for example, changing the layout, the processing in step S2 and subsequent steps is repeated.

In a case in which it is determined in step S7 that there is no problem, the layout determination result in step S5 is output via the output unit 16 (step S8).

Since the simulation data 1 according to the present embodiment includes not only the model information I2 but also the part shape information I1 and the symbol information I3, it is possible to easily and automatically select the symbol of the part 2 used in the simulation target circuit and to promptly generate the simulation target circuit. Also, at the time of determining the layout, the layout can be determined in consideration of the shape and size of each part 2 based on the part shape information I1, and a wiring length and wiring capacitance between the respective parts 2 can easily be estimated. The wiring length and the wiring capacitance between the respective parts 2 estimated in the layout determination can be taken into consideration at the time of performing the circuit simulation, and the operation of the simulation target circuit can be examined in a state in which wiring delay close to actual wiring delay is given to each wire.

Figure 9:
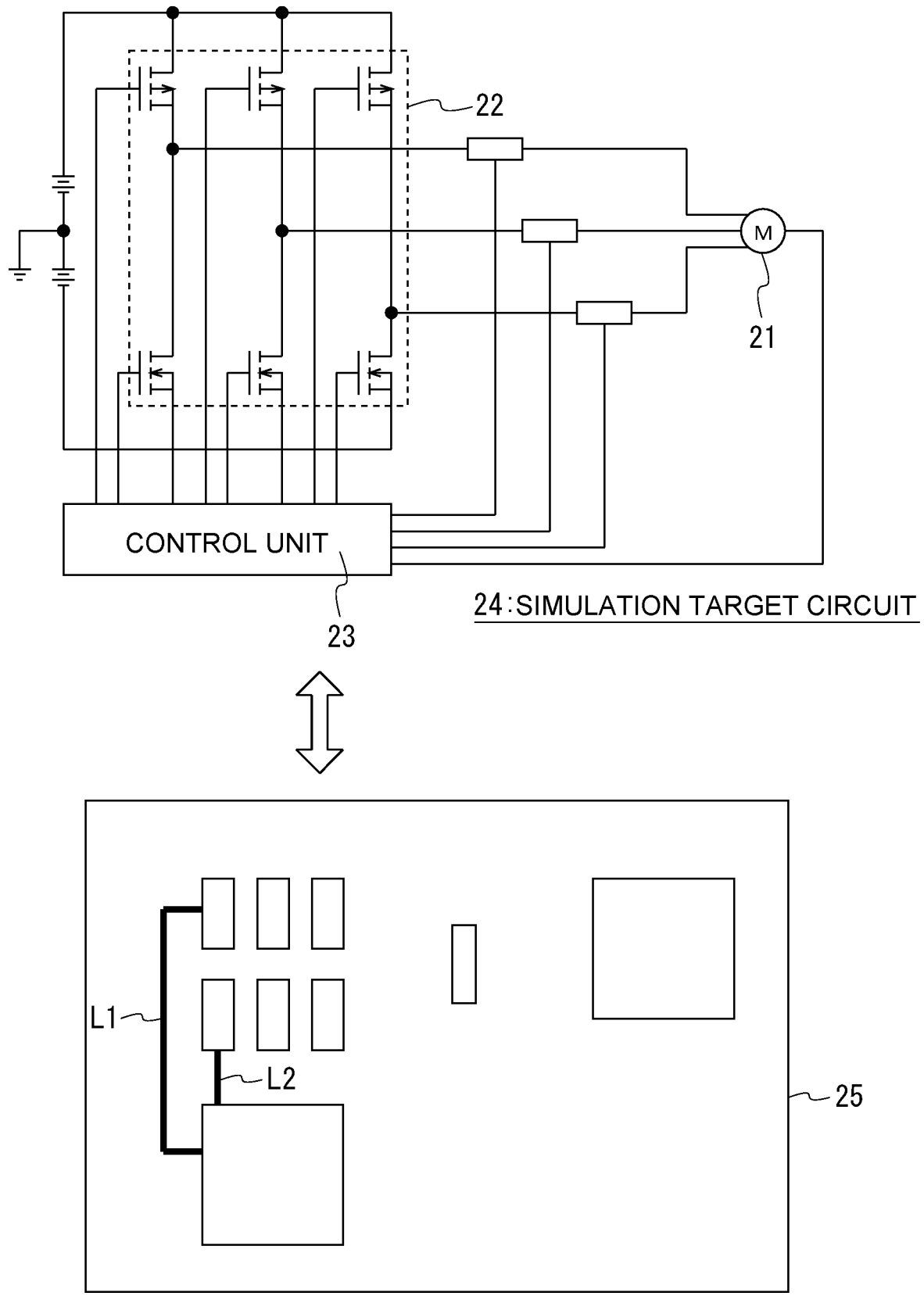
FIG. 9 is a schematic view in which the simulation target circuit is redesigned and in which the layout is redetermined.

FIG. 9 is a schematic view in which a simulation result of a simulation target circuit (upper side in FIG. 9) 24 generated by the computing device 10 according to the present embodiment and a determination result of a layout (lower side in FIG. 9) 25 are mutually used to redesign the simulation target circuit and predetermine the layout.

For example, as in the case of wires L1 and L2 in the layout 25 illustrated in FIG. 9, a case in which the wiring length from the control unit 23 to the gate of the transistor 22 differs depending on the transistor 22 will be described.

The simulation data 1 according to the present embodiment includes the part shape information I1. Accordingly, at the time of determining the layout, the respective parts 2 can be arranged and connected by wiring in consideration of the shape and size of each part. For example, in the layout in FIG. 9, a result that the wire L1 is longer than the wire L2 is obtained. The longer the wiring length is, the higher the wiring capacitance becomes, and the more easily the wiring delay occurs. Therefore, by reflecting the result of the layout on the circuit simulation with use of the simulation target circuit on the upper side of FIG. 9, the circuit simulation can be performed in a state in which information that the wire L1 is more significant in terms of wiring delay than the wire L2 is added.

Figure 10A:
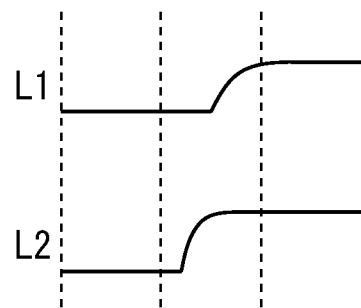
FIG. 10A is a signal waveform diagram illustrating a circuit simulation result of wires.

FIG. 10A is a signal waveform diagram illustrating a circuit simulation result of the wires L1 and L2. Since the wire L1 is longer in wiring length and is higher in wiring capacitance than the wire L2, the rise timing of the waveform of the wire L1 is delayed further than that of the wire L2, and the waveform of the wire L1 is rounded. In a case in which the rise timing of the signal is delayed, the circuit may not operate normally in some cases. However, in the circuit simulation according to the present embodiment, the difference in wiring length can be taken into consideration based on the layout determination result. Hence, the operation of the simulation target circuit can be examined by taking into consideration the difference in rise timing due to the difference in wiring length.

Figure 10B:
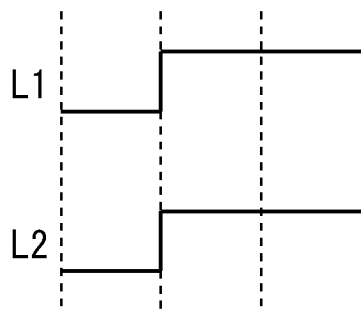
FIG. 10B is a signal waveform diagram in a case in which a simulation target circuit is generated only with use of model information to perform a circuit simulation.

FIG. 10B is a signal waveform diagram in a case in which a simulation target circuit is generated only with use of the model information I2 without use of the part shape information I1 and the symbol information I3 to perform a circuit simulation. In the case of FIG. 10B, since the difference in wiring length cannot be taken into consideration, the rise timings of the wires L1 and L2 in FIG. 9 are regarded as being equal, and the accuracy of the operation examination by means of the circuit simulation is lowered.

FIG. 9 illustrates an example in which the result of the layout determination based on the part shape information I1 is reflected on the circuit simulation. By calculating loss information of the respective parts 2 from the result of the circuit simulation and using the calculated loss information as conditions for a heat simulation in a physical form, the heat simulation can be performed under conditions close to conditions for the actual operation.

Figure 11:
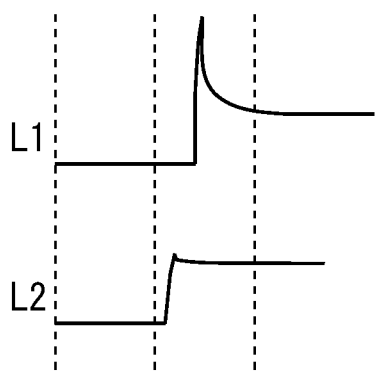
FIG. 11 illustrates a signal waveform in which overshoot is generated.

For example, attention is focused on the wires L1 and L2 in FIG. 9. Suppose that, as a result of performing a circuit simulation with use of the simulation target circuit in FIG. 9, the signal waveforms of the wires L1 and L2 are as illustrated in FIG. 11. It is estimated that the overshoot of the wire L1 is more significant than that of the wire L2, and that the heat generation amount of the transistor 22 connected to the wire L1 is larger. That is, it is estimated that the wire L1 is higher in heat loss than the wire L2. Therefore, by adding the heat loss information obtained in this circuit simulation to the heat simulation, the heat simulation can be performed, assuming that the transistor 22 connected to the wire L1 has a larger heat generation amount than the transistor 22 connected to the wire L2.

As described above, in the present embodiment, since the simulation data 1 including not only the model information I2 but also the part shape information I1 and the symbol information I3 is generated, a simulation can be executed in a state in which the layout of the parts 2 and the layout of the wires are close to actual ones, and the accuracy of the simulation can be improved.

Also, it is possible to promptly select the symbol of the part 2 used in the simulation target circuit, and it is possible to promptly generate the simulation target circuit that meets the designer's intention. Also, by using the part shape information I1, the shape and size of the part 2 arranged in the layout region can be close to the actual ones.

Also, according to the present embodiment, by determining the layout based on the part shape information I1, it is possible to figure out the difference in wiring length from the layout determination result, and by reflecting the difference in wiring length on the circuit simulation, it is possible to perform the circuit simulation in consideration of the wiring delay.

Also, according to the present embodiment, the loss information of each part 2 can be estimated from the result of the circuit simulation, and by reflecting the loss information on the heat simulation, the temperature distribution in the layout region can accurately be estimated.

The aforementioned simulation data 1 in FIG. 1 may be data in the form of a program executable by the computing device 10. That is, the simulation data 1 in FIG. 1 may be described in the form of a program in which the part shape information I1, the model information I2, and the symbol information I3 are respectively different parameters. More specifically, in this program, one or a plurality of functions executable by the computing device 10 may be described, and the part shape information I1, the model information I2, and the symbol information I3 may be given as arguments of these functions.

At least a part of the computing device 10 described in the above embodiment may be configured to act as hardware or software. In a case in which at least a part of the computing device 10 is configured to act as software, a program that fulfills the function of at least a part of the computing device 10 may be stored in a recording medium such as a flexible disk and a CD-ROM, read by a computer, and executed. The recording medium is not limited to a removable medium such as a magnetic disk and an optical disk, but may be a fixed recording medium such as a hard disk device and a memory.

Also, a program that fulfills the function of at least a part of the computing device 10 may be distributed via a communication line (including wireless communication) such as the Internet. Further, the program may be distributed in a state of being encrypted, modulated, or compressed via a line such as the Internet by cable or by radio or in a state of being stored in a recording medium.

While certain embodiments have been described, these embodiments have been presented by way of example only, and are not intended to limit the scope of the disclosures. Indeed, the novel methods and systems described herein may be embodied in a variety of other forms; furthermore, various omissions, substitutions and changes in the form of the methods and systems described herein may be made without departing from the spirit of the disclosures. The accompanying claims and their equivalents are intended to cover such forms or modifications as would fall within the scope and spirit of the disclosures.

The invention claimed is:

1. A computer program product comprising a non-transitory recording medium comprising code which when executed on a computing device will cause the computing device to perform the following steps, comprising:
   store simulation data to be input into the computing device for executing a simulation of a semiconductor device,
   wherein the simulation data is described in an integrated file, the integrated file including:
   part shape information describing a shape of a part included in a simulation target circuit,
   model information describing operation and connection information of the simulation target circuit, and
   symbol information of the part included in the simulation target circuit, and
   the computing device causes the part shape information, the model information, and the symbol information included in the integrated file to correspond to each other to execute the simulation of the semiconductor device.

2. The computer program product according to claim 1, wherein the part shape information includes information defining an outer shape of the part.

3. The computer program product according to claim 2, wherein the part shape information includes positional information of a corner of the part.

4. The computer program product according to claim 1, wherein the part shape information includes positional information of a terminal of the part.

5. The computer program product according to claim 1, wherein the model information includes connection information of the part included in the simulation target circuit and operation information of the part.

6. The computer program product according to claim 1, wherein the model information includes information about a terminal of the part, and the information about the terminal of the part includes information indicating correspondence to the terminal of the part included in the part shape information.

7. The computer program product according to claim 6, wherein the information about the terminal of the part includes connection information of the terminal of the part.

8. The computer program product according to claim 1, wherein the model information includes a file name of a file describing operation of the simulation target circuit and information for reference to the file.

9. The computer program product according to claim 1, wherein the symbol information differs per type of the part and includes positional information of a terminal of the part.

10. The computer program product according to claim 9, wherein the symbol information includes the positional information of the terminal of the part described to correspond to the positional information of the terminal of the part included in the part shape information.

11. The computer program product according to claim 1, wherein the part shape information, the model information, and the symbol information are described in a format interpreted and executed by the computing device executing a simulation of the simulation target circuit.

12. The recording medium according to claim 1,
wherein the part shape information, the model information and the symbol information in the integrated file is text information composed of ASCII code.

13. A computing method comprising:
inputting simulation data including part shape information describing a shape of a part included in a simulation target circuit, model information describing operation of the simulation target circuit, and symbol information of the part included in the simulation target circuit, the simulation data being described in an integrated file; and
causing the part shape information, the model information, and the symbol information included in the integrated file to correspond to each other to execute a simulation of the simulation target circuit.

14. The computing method according to claim 13, comprising:
generating the simulation target circuit based on the model information and the symbol information;
examining the simulation target circuit generated;
determining a layout of the part based on the simulation target circuit examined, the part shape information, and the model information; and
examining the layout of the part.

15. The computing method according to claim 14,
wherein, in the examination of the layout of the part, a layout position of the part is examined based on the part shape information and the connection information of the part included in the model information.

16. A computing device comprising:
an input unit inputting simulation data including part shape information describing a shape of a part included in a simulation target circuit, model information describing operation of the simulation target circuit, and symbol information of the part included in the simulation target circuit, the simulation data being described in an integrated file; and
an execution unit causing the part shape information, the model information, and the symbol information included in the integrated file to correspond to each other to execute a simulation of the simulation target circuit.

17. The computing device according to claim 16, further comprising processing circuitry configured to:
generate the simulation target circuit based on the model information and the symbol information;
examine the simulation target circuit generated;
determine a layout of the part based on the simulation target circuit examined, the part shape information, and the model information; and
examine the layout of the part.

18. The computing device according to claim 17,
wherein, in the examination of the layout of the part, a layout position of the part is examined based on the part shape information and the connection information of the part included in the model information.

19. The computing device according to claim 16,
wherein the part shape information includes information defining an outer shape of the part.

20. The computing device according to claim 19,
wherein the part shape information includes positional information of a corner of the part.

21. The computing device according to claim 16,
wherein the part shape information includes positional information of a terminal of the part.

* * * * *